United States Patent [19]
Maeda et al.

[11] Patent Number: 5,339,315
[45] Date of Patent: Aug. 16, 1994

[54] CABLE BROADCASTING SYSTEM AND THE TRANSMISSION CENTER FOR ON DEMAND PROGRAM SERVICES

[75] Inventors: Kazuki Maeda; Kuniaki Utsumi; Katsuyuki Fujito, all of Osaka, Japan

[73] Assignee: Matsushita Electric Industrial Co., Ltd., Osaka, Japan

[21] Appl. No.: 887,475

[22] Filed: May 22, 1992

[30] Foreign Application Priority Data

May 24, 1991 [JP] Japan .................. 3-119832
Jan. 27, 1992 [JP] Japan .................. 4-120809

[51] Int. Cl.$^5$ .............................. H04N 7/173
[52] U.S. Cl. ...................... 370/85.1; 370/95.1; 348/7; 455/4.2
[58] Field of Search .......... 380/20, 19, 10; 358/84, 358/14, 86, 15, 141, 142, 147, 114; 455/4.1, 4.2, 5.1, 6.1, 6.2; 370/71, 73, 69.1, 124, 85.1, 95.1, 70, 50, 49.5, 85.1

[56] References Cited

U.S. PATENT DOCUMENTS

| | | | |
|---|---|---|---|
| 4,205,343 | 5/1980 | Barrett ............................... | 358/147 |
| 4,484,027 | 11/1984 | Lee .................................. | 358/122 |
| 4,658,292 | 4/1987 | Okamoto et al. .................... | 380/20 |
| 4,890,322 | 12/1989 | Russell, Jr. ......................... | 380/20 |
| 5,172,413 | 12/1992 | Bradley et al. ..................... | 380/20 |

OTHER PUBLICATIONS

An FM-FDM Hi-Vision Optical CATV System Employing Demand Access Method by Mikio Maeda et al. 1989 Shingakugiho vol. 89, No. 304 pp. 7-12.
Switched Digital Video-The Opportunities and Challenges of Heathrow by Alan F. Graves Nat'l Comm. Forum, vol. 43, No. 2 pp. 1125-1128.

*Primary Examiner*—Wellington Chin
*Attorney, Agent, or Firm*—Price, Gess & Ubell

[57] ABSTRACT

The present invention provides a cable broadcasting system and the transmission center employed therein. In the transmission center, plural images are divided into several groups in the same kinds and each image in one kind is repeated not simultaneously so that they are outputted as independent plural image signals, and the image that the subscribers have requested is selected from those plural image signals which is enciphered, modulated, and multiplexed to be transmitted in optical transmission lines through an available channel to the subscribers, while the transmission channel is validated as well as the enciphered image signal is deciphered at the subscribers' end in order to enable the subscribers to watch the image they have requested.

23 Claims, 9 Drawing Sheets

CABLE BROADCASTING SYSTEM AND THE TRANSMISSION CENTER FOR ON DEMAND PROGRAM SERVICES

BACKGROUND OF THE INVENTION (1) Field of the Invention

The present invention relates to a cable broadcasting system by which an image signal is broadcast by an on-demand-video service method through a cable network such as a public network of Broadband Integrated Service Digital Network (B-ISDN) or a cable television (CATV) and a transmission center employed therein.

(2) Description of the Related Art

In a cable broadcasting system based on a cable network, such as represented by the CATV, a program is broadcast according to a timetable for each channel like in a wireless broadcasting service. Subscribers of the cable broadcasting system choose a program according to a time slot and a channel thereof specified in the timetable, although only a few dozen channels are available due to bearer capability.

Recently, a new service method taking the advantage of the two-way method of the CATV, i.e. a pay-TV or a pay-per-view service, has been in practical use, in which a program is provided only to the subscribers who have requested the program. By such a method, although various programs and accompanying services are available for a charges, the subscribers still have to choose their program according to a time slot d a channel as specified in the timetable.

It is therefore the subscribers who arrange their schedule to the program they would like to watch, and when they missed the program or would like to watch it again, they have to wait for a repeat. Thus, a limited number of the available channels provide the subscribers limited options to a program selection and a less flexible schedule. In brief, the subscribers can neither choose a program among various kinds or programs nor watch it at their convenience with the conventional cable broadcasting system. Therefore, and on-demand-video service method is proposed in order to add the options, by which a program selected from a large program library in a broadcasting station is transmitted to the subscribers at their request.

Such a video distribution system capable of answering the subscribers' request is proposed in "FM Multiplex High-Vision Optical CATV System by a Demand-Access Method", by Mikio Maeda Nippon Hoso Kyokai Giken, Shingakugiho Vol. 89 No. 304 (OQE8 9 91-95) pp. 7-12, and "Alan F. Graves (Bellcore) 'Switched digital video-The opportunities and challenges of Heathrow' Pro. National Communication Forum Vol. 43 No. 2 pp. 1125-1128."

According to the system, upon receiving the subscribers' requests for the programs, the broadcasting station selects each program and transmits it only to those who have requested it.

However, the system requires transmission line in a star network in order to connect the broadcasting station directly to each subscriber and a switch device for each subscriber for the program selection. Therefore, introducing the on-demand-video service method to the CATVs with existing transmission lines in a tree network requires a complete line exchange. Furthermore, more massive and complicated hardware will be necessary at the broadcasting station, thereby increasing service costs. In addition, since the system proposed in the aforementioned publication is supposed to be available to the timetable, the options in the program selection remain limited.

SUMMARY OF THE INVENTION

The present invention has a primary object to provide a cable broadcasting system by which the subscribers can choose an image among various programs and watch it at their convenience.

Also the present invention has another object to provide a cable broadcasting system in which image signals are transmitted thorough an inexpensive structure without depending on a topology of the transmission lines.

Further, the present invention has another object to provide an optimal transmission center for the cable broadcasting system.

These objects are fulfilled by a transmission center employed in a cable broadcasting system having transmission lines with a plurality of channels through which a multiplexed image signal with a plurality of channels can be simultaneously transmitted. The transmission center includes the following construction.

The construction comprises an image signal outputting unit for outputting plural images to be provided to the subscribers in image signals, each image being simultaneously available in several time-shifted versions, a first selection unit for selecting one image signal that the subscribers have requested among the image signals, a second selection unit for selecting an available transmission channel for the image signal transmission to the subscribers, a transmission unit for transmitting the image signal selected by the first selection unit through the channel selected by the second selection unit, and a notifying unit for notifying the subscriber of the selected channel.

The number of the first selection units may be the same as the number of the channels in the transmission lines and the number of the second selection units and the number of the transmission units may be the same as the number of the transmission lines.

The image signal outputting unit may include a circuit which time-division multiplexes all the image signals outputted and the first selection unit may include a circuit which selects one time-division multiplex (TDM) signal including the image signal that the subscribers have requested among all the TDM signals and thereafter disassembles the TDM signal into the image signals.

The first selection unit may include storing unit for storing all time slots in order to select the signal image at the earliest time slot after having received the request.

The second selection unit may include a monitoring unit for monitoring the channel occupancy in order to select an available channel upon receiving the request.

The transmission center may include construction to encipher the image signal selected by the first selection unit, subsequently to modulate and multiplex the enciphered signal image, and to transmit it through the channel selected by the second selection unit.

The transmission unit may include construction to convert the multiplex signal into an optical signal to be transmitted in the transmission lines.

The notifying unit may include construction to notify the subscribers of the channel through which the image signal is transmitted as well as to notify a deciphering key to decipher the enciphered image signal.

These objects are also fulfilled by a cable broadcasting system having transmission lines with a plurality of channels through which multiplexed image signals with a plurality of channels can be simultaneously transmitted. The cable broadcasting system includes the following construction.

The construction comprises an image signal outputting unit for outputting plural images to be provided to the subscribers in image signals, each image being simultaneously available in several time-shifted versions, a first selection unit for selecting one image signal that the subscribers request among the image signals, a second selection unit for selecting an available transmission channel for the image signal transmission to the subscribers, a transmission unit for transmitting the image signal selected by the first selection unit through the channel selected by the second selection unit, a notifying unit for notifying the subscriber of the selected channel, a receiving unit installed in each subscriber's end for receiving the image signal transmitted from the transmission unit, and the subscribers as receivers of the image signal.

The number of the first selection units may be the same as the number of channels in the transmission lines and the number of the second selection units and of the transmission unit may be the same as the number of the transmission lines.

The image signal outputting unit may include a circuit which time-division multiplexes all the image signals outputted, and the first selection unit may include a circuit which selects one TDM signal including the signal image that the subscribers have requested among all the TDM signals and thereafter disassembles the TDM signal into the image signals.

The first selection unit may include a storing unit for storing all time slots in order to select the signal image at the earliest time slot after having received the request.

The second selection unit may include a monitoring unit for monitoring the channel occupancy in order to select an available channel upon receiving the request.

The transmission unit may include construction to encipher the image signal selected by the first selection unit, subsequently to modulate and multiplex the enciphered signal image, and to transmit it through the channel selected by the second selection unit.

The transmission unit may include construction to convert the multiplexed signal into an optical signal to be transmitted in the transmission lines.

The receiving units may be divided into several subgroups in response to bearer capability of the transmission lines and to channel utility efficiency.

The notifying unit may include construction to notify the subscribers of the channel through which the image signal is transmitted as well as to notify a deciphering key to decipher the enciphered image signal.

The receiving unit may include construction to receive the deciphering key.

The transmission lines may be optical transmission lines.

The cable broadcasting system and transmission center constructed as above can provide the subscribers a myriad of images which has never been attained before as well as enables them to watch the desired image at their convenience. In other words, the cable broadcasting system of the present invention not only adds the options in the program selection but also enhances the schedule flexibility.

Furthermore, the transmission of the image signal by converting it into the optical signal enables the broadcasting station to transmit the image signal to many subscribers at great distances. Since the subscribers are divided into several groups in response to the bearer capability or the efficiency of channel utility, the high-quality image can be distributed to all the subscribers regardless of the distance.

Moreover, image transmission independent of the topology of the transmission lines enables the system to take the advantage of a combination of the optical transmission lines in the trunk group and the coaxial transmission lines in the distribution group. Therefore, the system can utilize the existing transmission lines in the tree network of the CATVs, thereby reducing the costs when applying the system thereto.

BRIEF DESCRIPTION OF THE DRAWINGS

These and other objects, advantages and features of the invention will become apparent from the following description thereof taken in conjunction with the accompanying drawings which illustrate specific embodiments of the invention, in the drawings.

DESCRIPTION OF THE PREFERRED EMBODIMENTS

Embodiments of the present invention are described hereunder with referring to the drawings.

Figure 1:
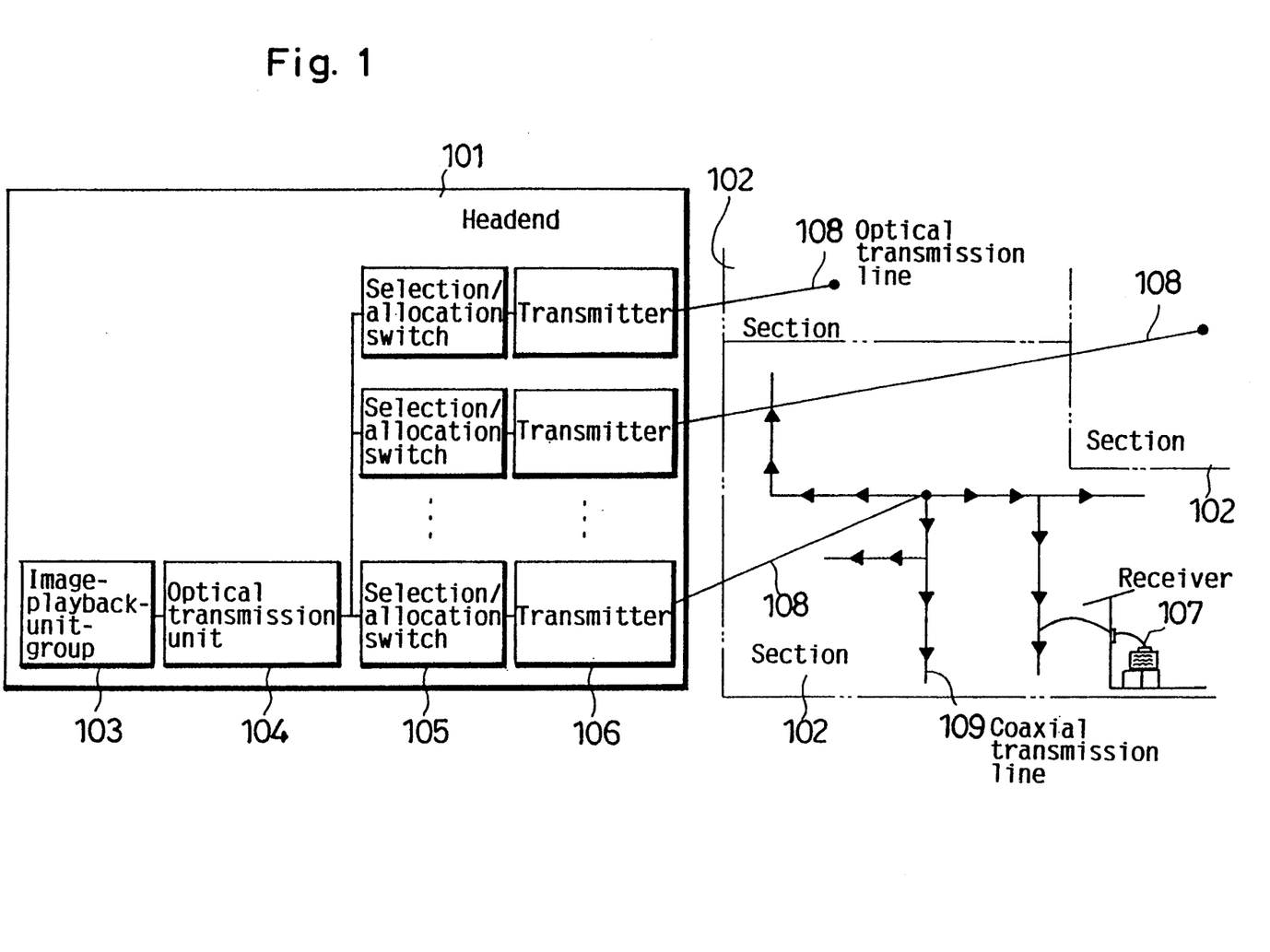
FIG. 1 is a block diagram showing a structure of a cable broadcasting system of the present invention.

FIG. 1 is a block diagram showing a structure of a cable broadcasting system of the present invention applied to a CATV system. Numeral 101 refers to a transmission center, or a CATV broadcasting station. Numeral 102 refers to plural sections in a network area, each having a certain number of subscribers. Numeral 103 refers to an image-playback-unit group which outputs image signals for an on-demand-video service method. Numeral 104 refers to an optical signal transmission unit which transmits the image signals from the image-playback-unit group 103 by converting them into optical time-division multiplex (TDM) signals. Numeral 105 refers to a selection/allocation switch which selects the corresponding image signal to the image that the subscriber has requested and allocates an unutilized channel to the selected image signal. Numeral 106 refers to a transmitter which enciphers and multiplexes the image signal from the selection/allocation switch 105 and thereafter transmits it to a receiver 107 including a CATV converter. Each of the transmitter 106 and receiver 107 includes an optical transmitter and an optical receiver. The image signal and a control signal which will be described later are transmitted both ways between the transmitter 106 and receiver 107. Numeral 108 refers to optical transmission lines in the star network belonging to the trunk group, and numeral 109 refers to the coaxial cable transmission lines in the tree network belonging to the distribution group, which are utilized in a combination in the embodiments: the optical transmission lines 108 are utilized between the transmission center 101 and each section 102 while the coaxial cable transmission lines 109 are utilized within each section 102. Each mark refers to a translator.

A network area is divided into several sections 102, each having a certain number of the subscribers. Further, the selection/allocation switch 105 for the program selection and the transmitter 106 are installed for each section 102. In other words, the selection/allocation switch 105 selects the image signals at the request of the limited subscribers within the section. Such a transmission system facilitates to maintain an optimal correlation between the number of channels necessary for the subscribers requesting the images and the number of channels available for transmitting the image signals, bringing high efficiency of the channel utility and the transmission of the high-quality images, and therefore making the best use to the available channels. Concerning a limit on branching and interchangeability with the existing systems, it is desirable to divide a network area into several sections 102 in response to the number of the subscribers and to utilize the optical transmission lines 108 in the star network from the transmission center 101 to each section 102, and the coaxial cable transmission lines 109 in the tree network within each section 102.

Figure 2:
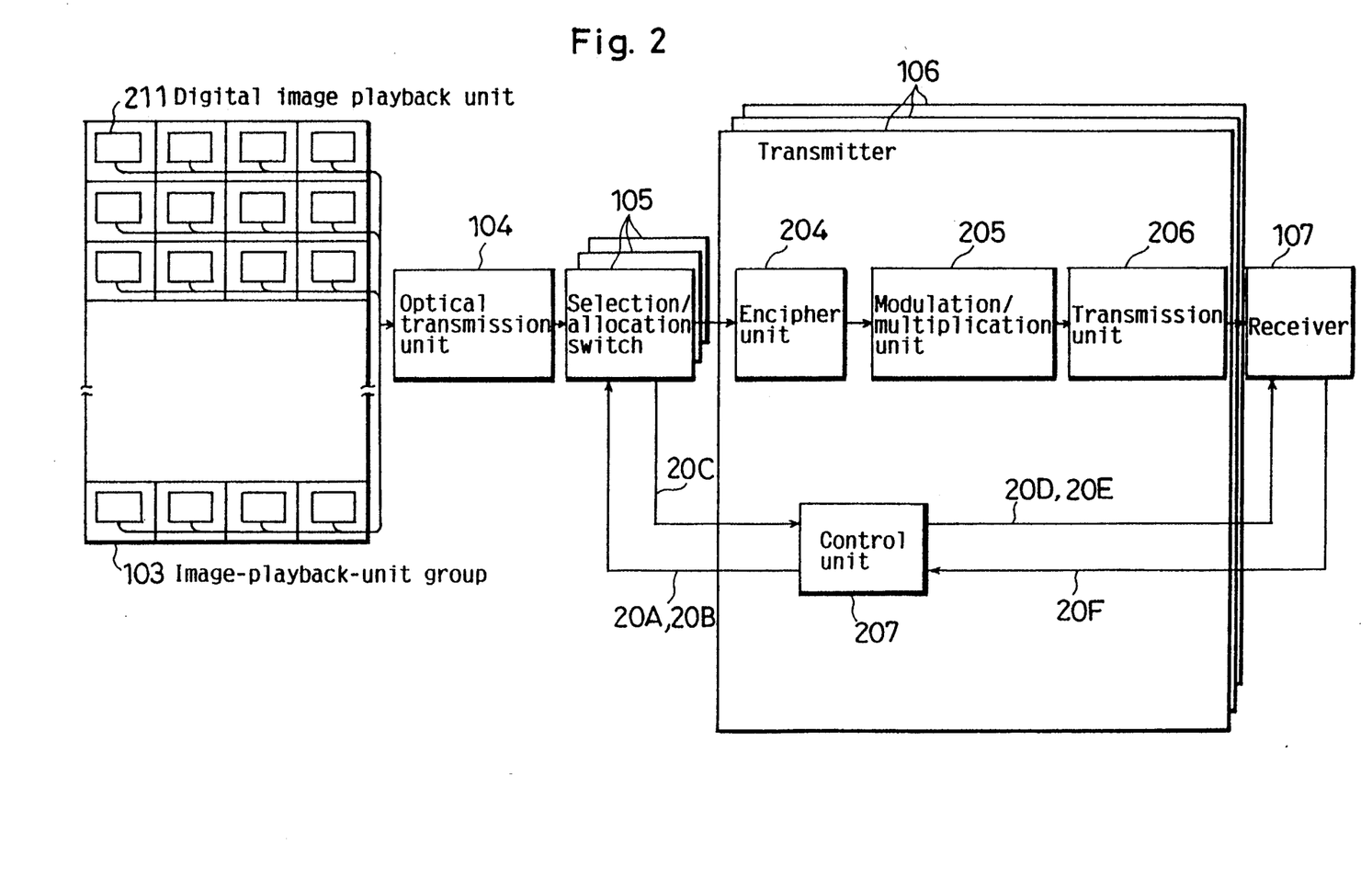
FIG. 2 is a block diagram showing the system function.

FIG. 2 is a block diagram showing the function of the system, and particularly, showing detailed constructions of the image-playback-unit group 103 and transmitter 106. The image-playback-unit group 103 comprises a plurality of digital image playback devices 211 featuring an automatic playback function such as video disk players or videotape recorders (VTRs) with an easy software programs replacement. Therefore, more kinds of images will be available by increasing the digital image playback units 211 or replacing software programs frequently. Although either analog or digital signals can be utilized in the image playback units, compressed digital signals are utilized in the embodiment, because the digital signals are able to prevent image deterioration occurring at the enciphering, in addition, the compressed digital signals are able to prevent image deterioration caused by leakage of image signal occurring at the switching.

Figure 4:
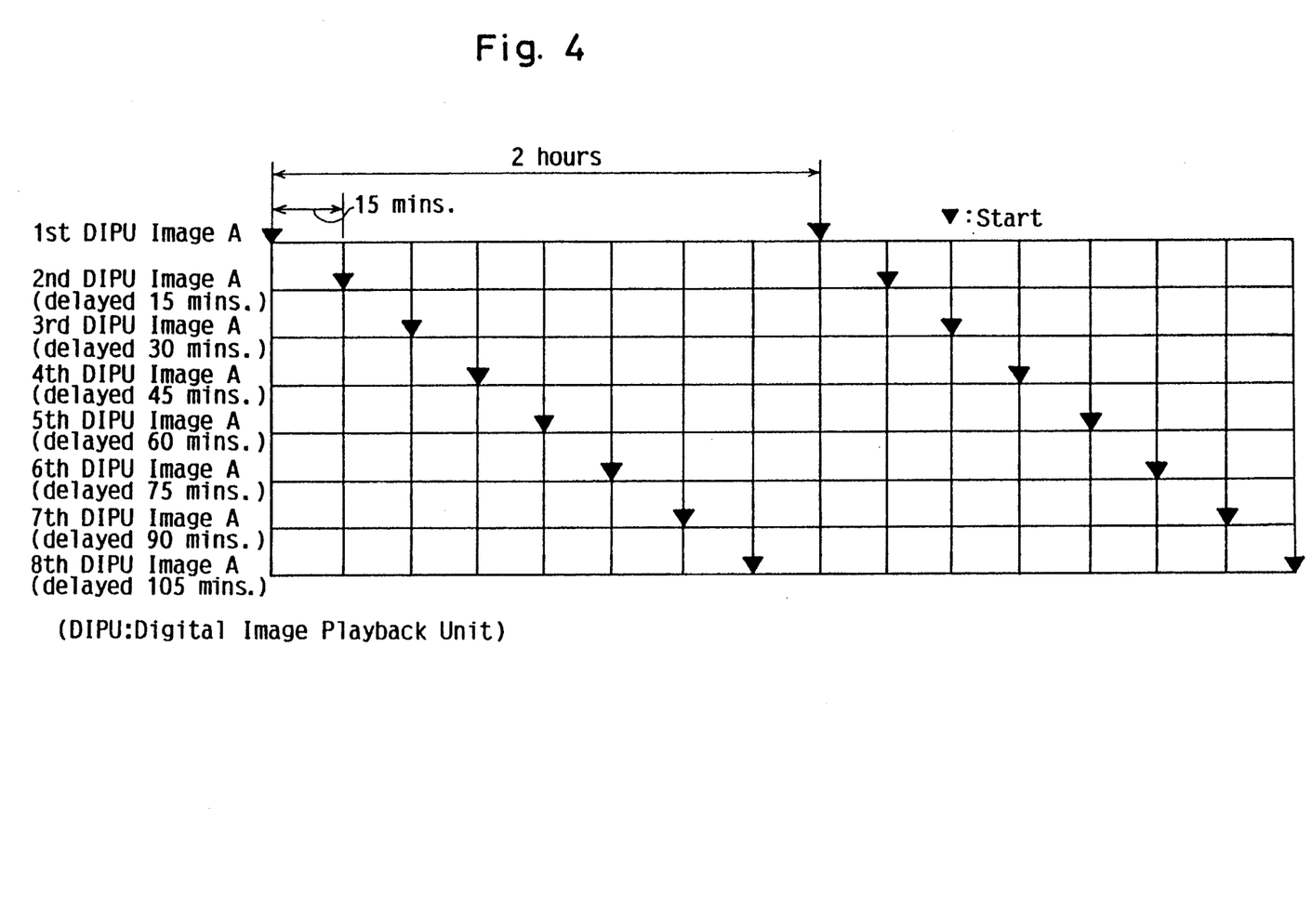
FIG. 4 is a timing chart explaining the function of the original image signal output.

The plurality of digital image playback units 211 is divided into several sub-groups. Each digital image playback unit 211 in each sub-group automatically, independently and continuously repeats the image, which is repeated at regular intervals. The image is repeated in the timing as shown in FIG. 4, provided if each sub-group consists of the 8 digital image playback units 211, the image is 2 hours long and the interval is 15 minutes. Therefore, if the image-playback-unit group 103 comprises the 1024 digital image playback units 211, 128 kinds of images can be playbacked simultaneously. These 1024 image signals are outputted from the digital image playback units 211 in parallel signals and inputted into the optical transmission unit 104.

Upon receiving the parallel 1024 image signals, the optical transmission unit 104 converts them into several optical TDM signals, all of which are again converted into electrical signals to be inputted into each sub-switch 301 in the selection/allocation switch 105. The structure and function of the optical transmission unit 104 and selection/allocation switch 105 are described in FIGS. 3 and 7.

Figure 7:
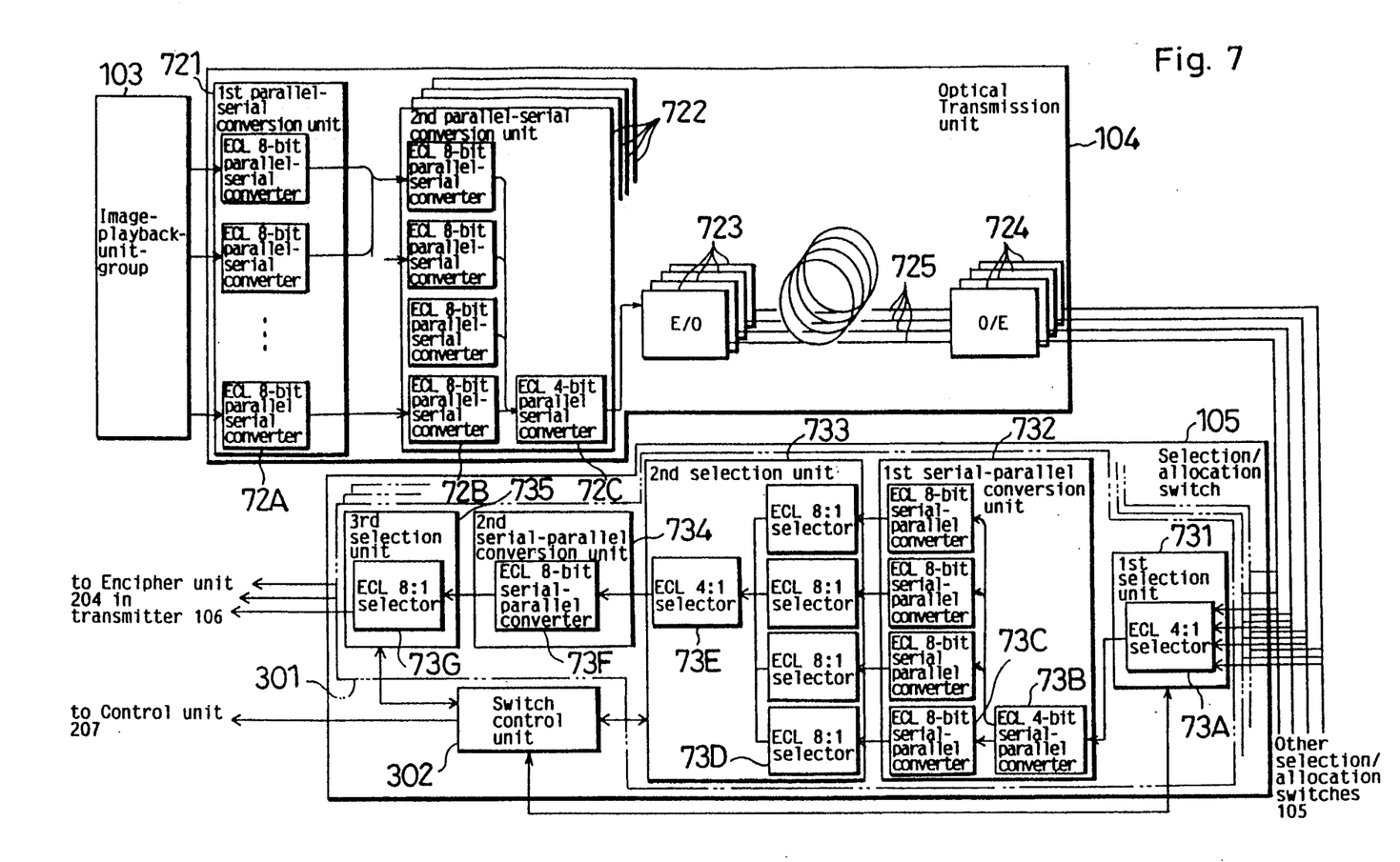
FIG. 7 is a block diagram showing the function of the optical signal transmission unit and selection/allocation switch.

FIG. 7 is a block diagram showing the function of the optical transmission unit 104 and selection/allocation switch 105. The optical transmission unit 104 comprises a first parallel-serial conversion unit 721, a second parallel-serial conversion unit 722, 4 electrical/optical conversion units (E/O) 723, 4 optical/electrical conversion units (O/E) 724, and 4 optical transmission lines 725. The first parallel-serial conversion unit 721 comprises 128 ECL (Emitter Coupled Logic) 8-bit parallel-serial converters 72A, and the second parallel-serial conversion unit 722 comprises 4 ECL 8-bit parallel-serial converters 72B and an ECL 4-bit parallel-serial converter 72C.

Figure 3:
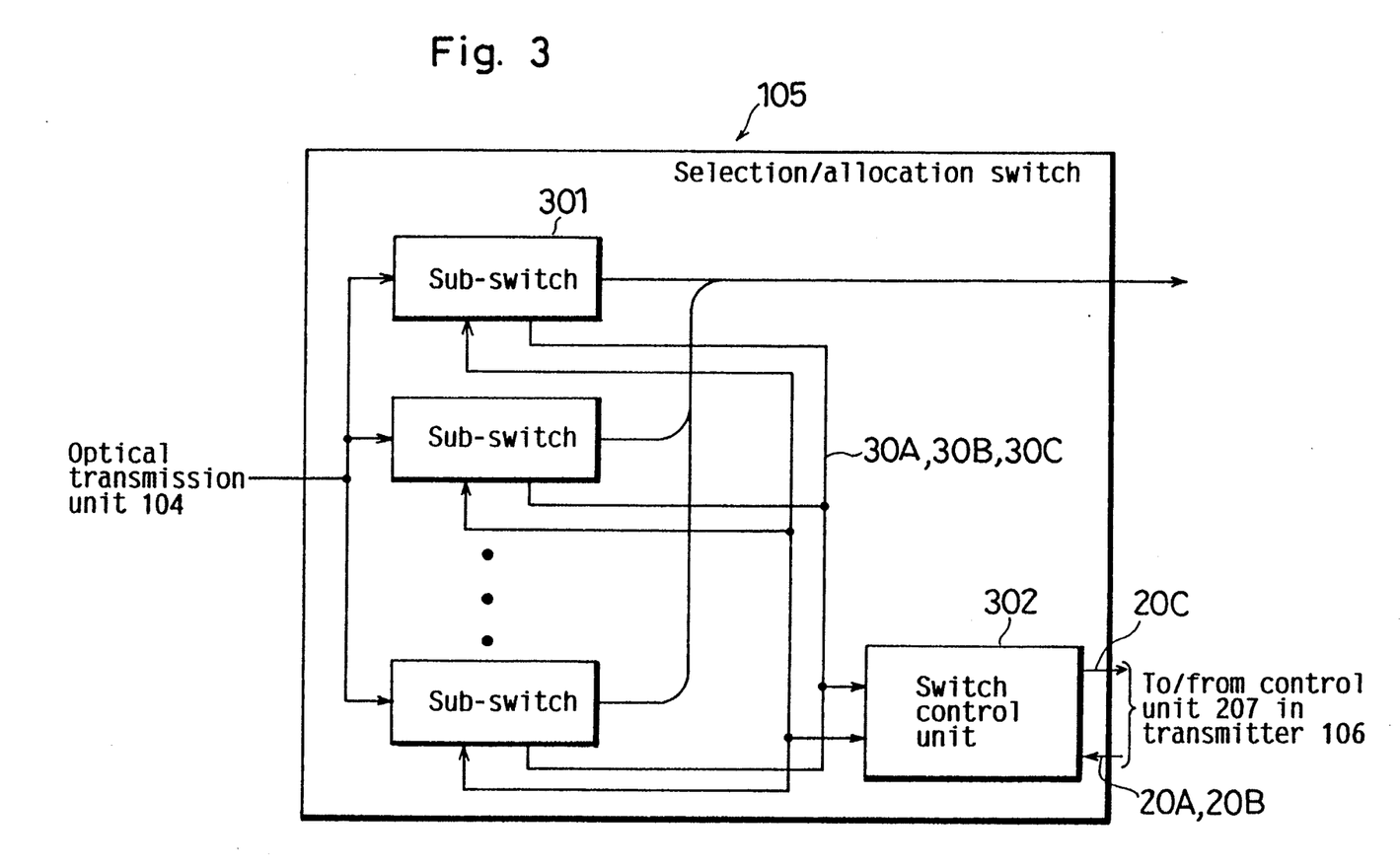
FIG. 3 is a block diagram showing the function of the selection/allocation switch.

FIG. 3 is a block diagram showing the function of the selection/allocation switch 105. The selection/allocation switch 105 comprises plural sub-switches 301 in the same number of the transmission channels, each of which being connected to the corresponding transmission channel, and the switch control unit 302 which controls a selection operation of the sub-switches 301.

As shown in FIG. 7, the sub-switch 301 comprises a first selection unit 731, a first serial-parallel conversion unit 732, a second selection unit 733, a second serial-parallel conversion unit 734, and a third selection unit 735. The first selection unit 731 comprises an ECL 4:1 selector 73A. The first serial-parallel conversion unit 732 comprises an ECL 4-bit serial-parallel converter 73B and 4 ECL 8-bit serial-parallel converters 73C. The first serial-parallel conversion unit 732 operates in a manner reverse to the second parallel-serial conversion unit 722. The second selection unit 733 comprises 4 ECL 8:1 selectors 73D and an ECL 4:1 selector 73E. The second serial-parallel conversion unit 734 comprises an ECL 8-bit serial-parallel converter 73F. The third selection unit 735 comprises an ECL 8:1 selector 73G.

The operation of the optical transmission unit 104 and selection/allocation switch 105 constructed as above is described hereunder.

The image-playback-unit group 103 outputs the 1024 image signals in the 128 kinds to the first parallel-serial conversion unit 721. Subsequently, each ECL 8-bit parallel-serial converter 72A converts the 1024 image signals into 128 TDM signals, each having the 8 image signals in the same kind. Further, the 128 TDM signals are divided among the 4 second parallel-serial conversion units 722.

Each of the 32 TDM signals are again divided among the 4 ECL 8-bit parallel-serial converters 72B, thereby outputting the 64 image signals per the parallel-serial conversion unit 722.

Each of the 64 image signals are inputted into the ECL 4-bit parallel-serial converter 72C, thereby outputting the 256 image signals per the parallel-serial conversion unit 722 which are outputted to the corresponding E/O 723. In brief, each of the 4 second parallel-serial conversion units 722 outputs the 256 image signals, which are converted into optical signals from the electrical ones by the 4 E/Os 723 and re-converted into the electrical signals by the 4 O/Es 724.

Provided that a data rate per image signal from the image-playback-unit group 103 is about 9 Mbps, a data rate per signal line is 9 Mbps×256=about 2.3 Gbps, which is the bearer capability required for transmission lines employed in the system. It is almost impossible to transmit such high rate signals electrically regardless of the distance because of damage and frequency band characteristics. It is therefore desirable to transmit the electrical image signals by converting them into the optical ones by the E/Os 723 in the optical transmission lines 725.

The 4 TDM signals re-converted into the electrical signals by the 4 O/Es 724 are inputted into the first selection unit 731 of the sub-switch 301 in the selection-/allocation switch 105. The ECL 4:1 selector 73A of the first selection unit 731 selects one of the TDM signal, or the 256 image signals, including the requested image signal based on the control signal from the switch control unit 302. The number of the image signal can be modified by increasing/decreasing the number of the ECL selectors or the like included in the first selection unit 731 in response to the number of the signal lines connected thereto.

The selected TDM signal is inputted into the first serial-parallel conversion unit 732. The ECL 4-bit serial-parallel converter 73B and 4 ECL 8-bit serial-parallel converters 73C in each first serial-parallel conversion unit 732 operate in a manner reverse to the ECL 4-bit parallel-serial converter 72C and 4 ECL 8-bit parallel-serial converters 72B in each second parallel-serial conversion unit 722. The ECL 4-bit serial-parallel converter 73B disassembles the selected TDM signal into 4 TDM signals and the ECL 8-bit serial-parallel converters 73C disassembles each of the 4 TDM signals into 8 TDM signals, thereby outputting 32 TDM signals, which are inputted into the second selection unit 733.

Each of the 4 ECL 8:1 selectors 73D in the second selection unit 733 are inputted with the 8 TDM signals from the corresponding ECL 8-bit serial-parallel converter 72B. Each of the 4 ECL 8:1 selectors 73D selects one TDM signal and only one of the ECL 8:1 selectors 73D selects the TDM signal including the image signal that the subscribers have requested based on the control signal from the switch control unit 302 while the other 3 ECL 8:1 selectors 73D output the remaining signals. Therefore, the ECL 4:1 selector 73E selects the TDM signal including the requested image signal which is outputted to the second serial-parallel conversion unit 734.

The ECL 8-bit serial-parallel converter unit 734.

The ECL 8-bit serial-parallel converter 73F in the second serial-parallel conversion unit 734 disassembles the TDM signal into the 8 image signals which are outputted to the third selection unit 735. The ECL 8:1 selector 73G in the third selection unit 735 selects the image signal which belongs to the requested kind and is available at the earliest time slot based on the control signal from the switch control unit 302.

In summary, only one of the image signals from all the digital image playback units 211 inputted into the optical transmission unit 104 is selected by the sub-switch 301 in the selection/allocation switch 105 and thereafter outputted to the transmission channel.

After the selection/allocation switch 105 selects the image signal described as above, the transmitter 106 transmits it to the receiving unit 107 through optical transmission lines 108.

The transmitter 106 comprises an encipher unit 204 which enciphers the image signal from the selection/allocation switch 105, a modulation/multiplication unit 205 by which the enciphered image signal is modulated by phase shift keying (PSK) or quadrature amplitude modulation (QAM) and subsequently frequency multiplexed, a transmission unit 206 which transmits the multiplexed signal to the receiver 107 by converting it into optical one, and a control unit 207 which controls the aforementioned 4 units as well as the selection/allocation switch 105.

As shown in FIGS. 2 and 3, the output from each sub-switch 301 in the selection/allocation switch 105 is inputted into the encipher unit 204. In the encipher unit 204, for instance, a code, or an appropriate code length of an M group, is allocated to each image. The image signal is enciphered by taking an exclusive OR of the M group signal and the compressed digital image signal inputted thereto. the enciphered image signal is subsequently inputted into the modulation/multiplication unit 205.

The modulation/multiplication unit 205 modulates the enciphered image signals by PSK or QAM on a carrier frequency and outputs it in the frequency multiplex signal. The modulation and multiplication method is selected in accordance with the network system. More precisely, it is preferable for the transmission lines of the CATV network to combine PSK or QAM and the frequency multiplexed signal, when a frequency band is limited within a network, data rate of the transmittable image signal within the band per channel can be adjusted to some extent by selecting the modulation method or QAM level, and it is preferable to apply time-division multiplex for a digital public network such as B-ISDN which is capable of transmitting the image.

Figure 5:
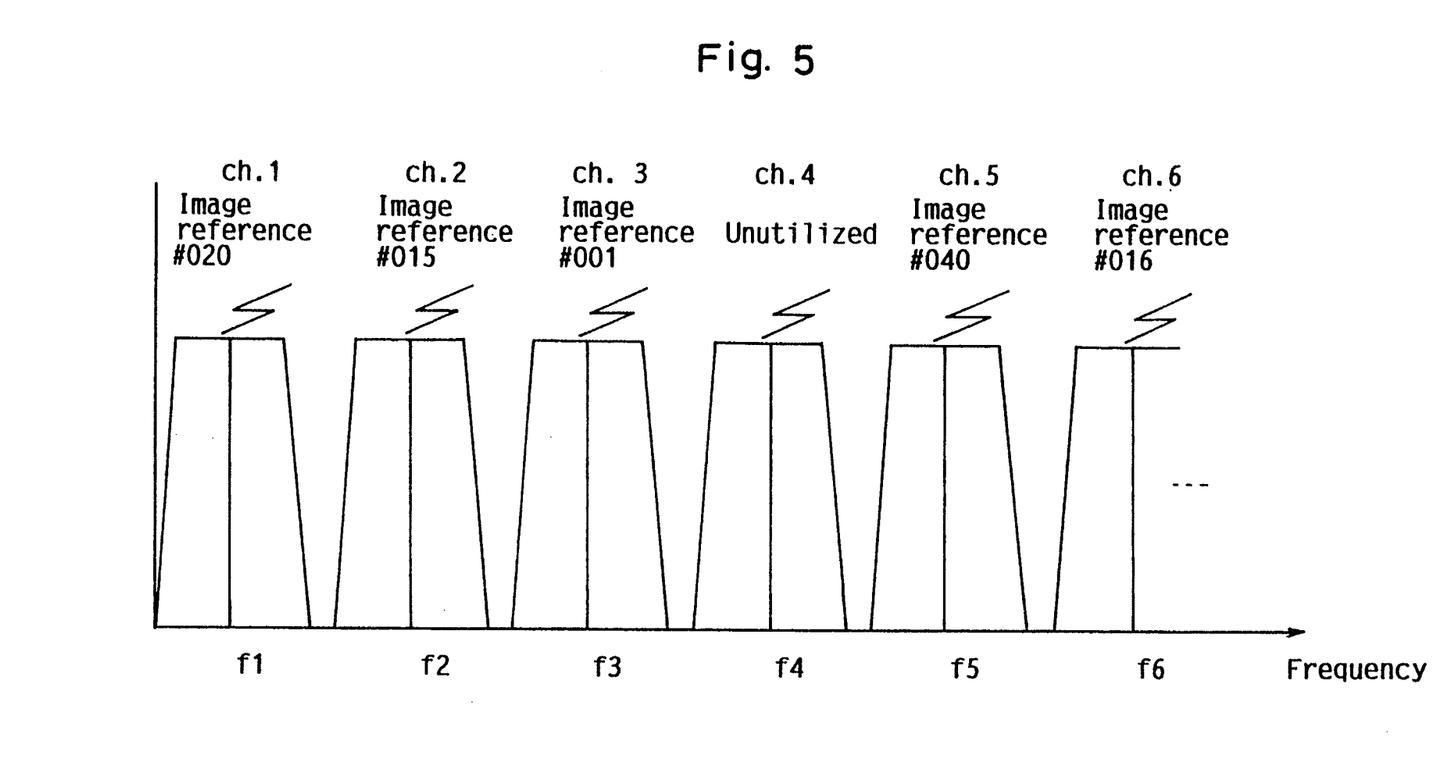
FIG. 5 is a view explaining the frequency multiplied transmitting signal after PSK or QAM.

The multiplexed image signal from the modulation/multiplication unit 205 is inputted into the transmission unit 206 which transmits it to the receiver 107 by converting it into the optical signal. FIG. 5 shows a frequency distribution after PSK or QAM and the frequency multiplex. Ch. 1(Channel 1) is allocated to the carrier frequency band f1, through which an image signal with a reference number 020 is being transmitted. Ch.4 is allocated to an unutilized carrier frequency band f4, through which another image signal can be transmitted.

The image signal transmitted from the transmission unit 206 is inputted into each receiver 107 installed at each subscriber's end through the optical transmission lines 108.

Following is the description how the selection/allocation switch 105 receives the request of the subscribers.

When the subscribers input image request data 20F through the receiver 107, the image request data 20F are transmitted to the control unit 207 by its two-way function. The control unit 207 controls the selection/allocation switch 105 and receiver 107 based on the image request data 20F from each receiver 107 and determines when and which image signal is to be transmitted to which subscribers.

Figure 9:
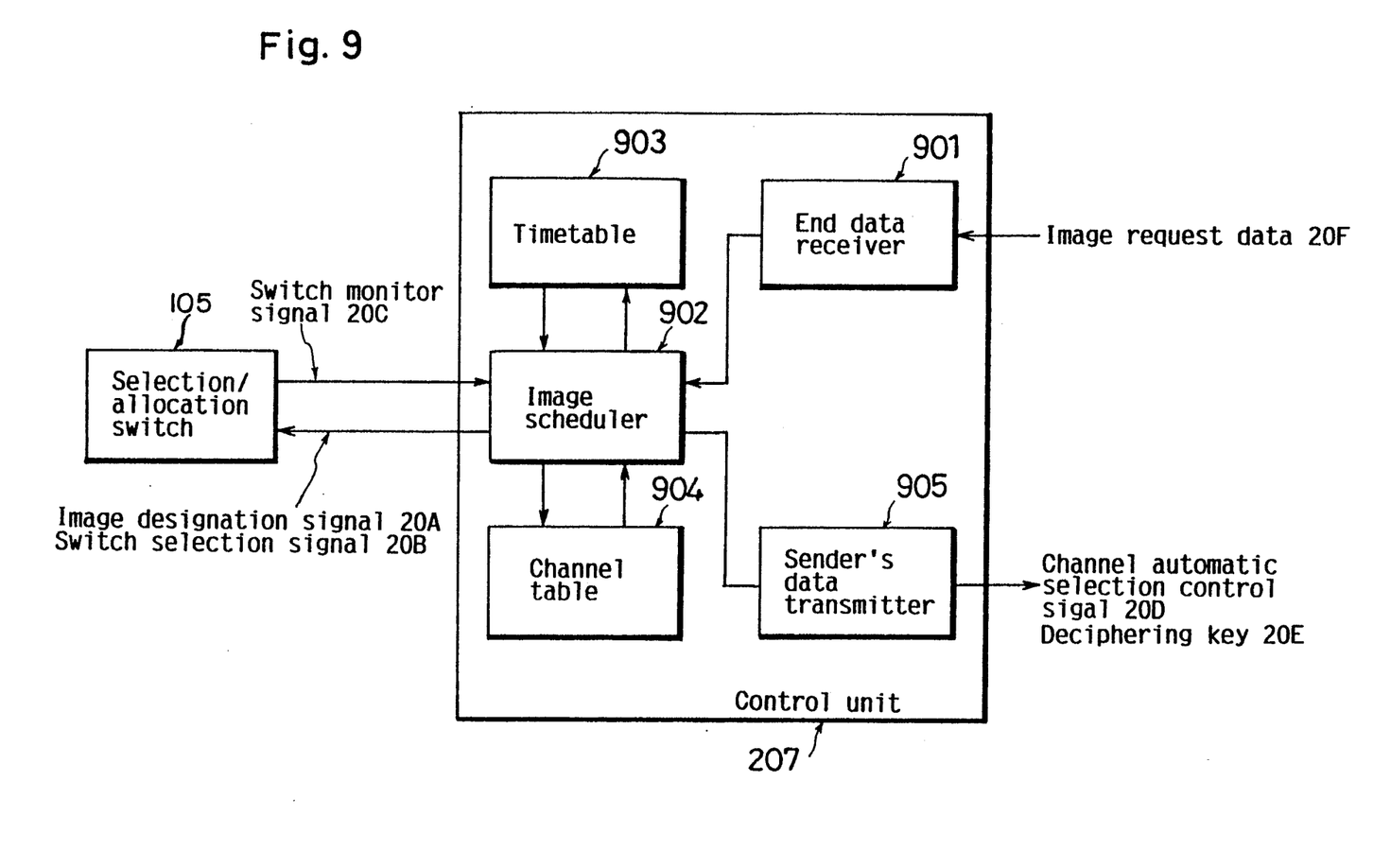
FIG. 9 is a block diagram showing the function of the control unit in the transmitter installed in the transmission center.

The detailed construction of the control unit 207 is shown in FIG. 9. The control unit 207 in the transmitter 106 comprises an end data receiver 901, an image scheduler 902, a timetable 903 storing the time slots for each image and deciphering keys for deciphering the enciphered image signals, a channel table 904, a sender's data transmitter 905. Upon receiving the image request data 20F inputted into the transmitter 106, the end data receiver 901 receives and outputs the image request data 20F to the image scheduler 902. After the image scheduler 902 validates the subscriber and requested image, it accesses information on channel occupancy and remaining time of the image from the channel table 904 in order to select an available transmission channel for the requested image, then it accesses information from the timetable 903 in order to select the image which starts the repeat at the earliest time slot and the deciphering key thereof. The image scheduler 902 outputs a deciphering key 20E and a channel automatic selection control signal 20D to the subscriber who has requested the image through the sender's data transmitter 905 prior to the transmission of the image signal. When there is no available channel at the moment, the image scheduler 902 transmits a message of the earliest available time slot instead of the image signal. Subsequently, the image scheduler 902 outputs an image designation signal 20A and a switch selection signal 20B to the selection/allocation switch 105 according to the image transmission timing.

Based on these two signals, a switch control unit 302 controls each sub-switch 301 to select the image which the subscriber has requested among the continuously repeating 1024 image signals with the earliest time slot through the corresponding channel.

Each sub-switch 301 output a status signal 30A indicating its activation/non-activation, a signal 30B specifying the kind of the outputted image, and a signal 30C indicating how long the image has been on the transmission to the switch control unit 302. Based on these three signals, the switch control unit 302 returns a switch monitor signal 20C indicating the status of the sub-switches 301 to the control unit 207 in the transmitter 106, on which the control unit 207 controls the selection/allocation switch 105 as described above.

Upon receiving the image signal, the receiver 107 deciphers the image signal back into the original compressed digital image signal with the previously inputted deciphering key 20E, thereby enabling the subscriber to watch the image that he/she has requested.

Even if the subscriber tunes in the same channel after having watched the image, no succeeding image will be on the screen unless he/she makes a request and an appropriate deciphering key 20E will be transmitted thereto.

It is apparent that the channel automatic selection control signal 20D and the deciphering key 20E are transmitted to all subscribers who have requested the same image prior to the transmission thereof.

Thus, enciphering the image signal and deciphering the enciphered image signal at the subscribers' end make it possible to transmit the image only to the subscribers who have requested it, therefore, separation and the validation of the subscribers are independent of the topology of the transmission lines. Consequently, even in the transmission lines of the tree network, in which plural signals in a multiplexed signal are simultaneously transmitted in the same signal line, the image is transmitted only to the subscribers who have requested it, thereby realizing the on-demand-video service method.

In the embodiment, the encipher unit 204 having the enciphering function is subsequently connected to the selection/allocation switch 105, however, it can be installed in each digital image playback unit 211. More precisely, if the number of the subscribers is rather small and the multiple of the number of the sections 102 and that of the transmission channels are smaller than that of the digital image playback units 211, it is preferable to install the encipher unit 204 subsequent to the selection/allocation 105 switch in respect of the costs and unit scale. On the other hand, if the number of the subscribers is rather big and the multiple of the number of the sections 102 and that of the transmission channels are larger than that of the digital image playback units 211, it is preferable to provide the enciphering function to each digital image playback unit 211 in respect of the costs and unit scale.

In the former case, an enciphering code is allocated to each transmission channel, therefore, the allocation must be controlled in order to ensure that the image signal is not deciphered without a proper request when the same enciphering code is concurrently utilized due to collision. While in the latter case, since an enciphering code is allocated to each image signal, it is not necessary to control the allocation, however, it requires a myriad of them. In brief, each enciphering method has its advantage and either of them can be applied according to the situation.

Figure 6:
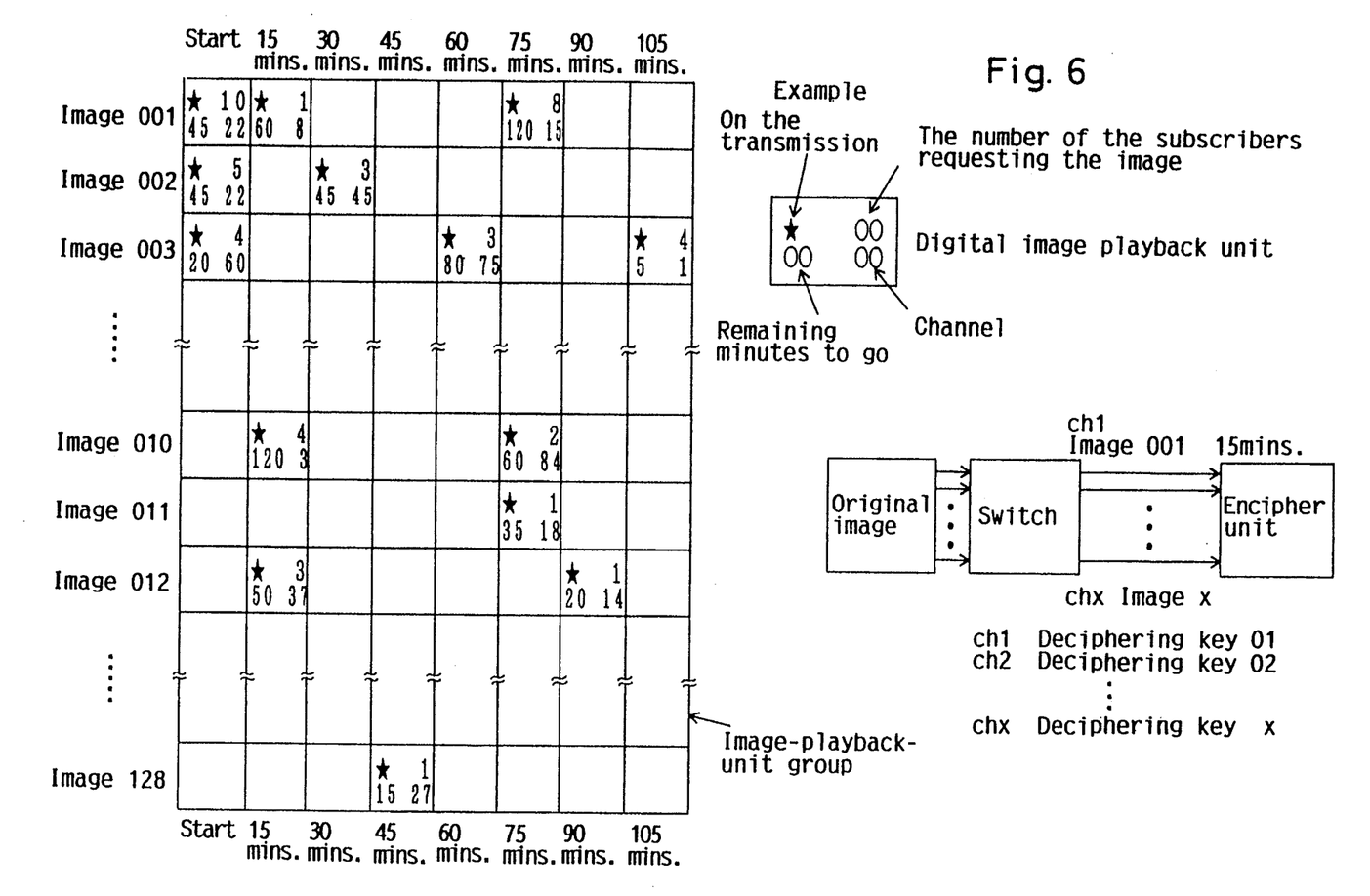
FIG. 6 is a view explaining the system operation in a section.

FIG. 6 shows the system operation within a section 102. Each square of the lattice on the left thereof represents the digital image playback unit 211. As previously described, the 128 kinds of the images with the corresponding reference numbers are repeated every 15 minutes by the 8 digital image playback units 211 constituting one sub-group. Within a square, a star in the upper left indicates that the image is being transmitted, a number in the upper right indicates the number of the subscribers who have requested the image, a number in the lower left indicates the remaining hours(minutes), and a number in the lower right indicates a channel number through which the image is transmitted. For example, the upper left corner square shows that an image signal with the reference number 001 is being transmitted through channel 22 with 45 minutes to go and has been requested by 10 subscribers. As shown in the right of FIG. 6, the selection/allocation switch 105 allocates the transmission channel of Ch. 1 for the image signal with reference number 001 repeating every 15 minutes, which is transmitted to the encipher unit 204 in the transmitter 106 at the request. The deciphering key 20E, such as one with a reference number 001 prepared for Ch. 1, has been previously transmitted to the subscribers who have requested the image, by which the image signal is deciphered back into the original compressed digital image signal at the subscribers' end.

Figure 8:
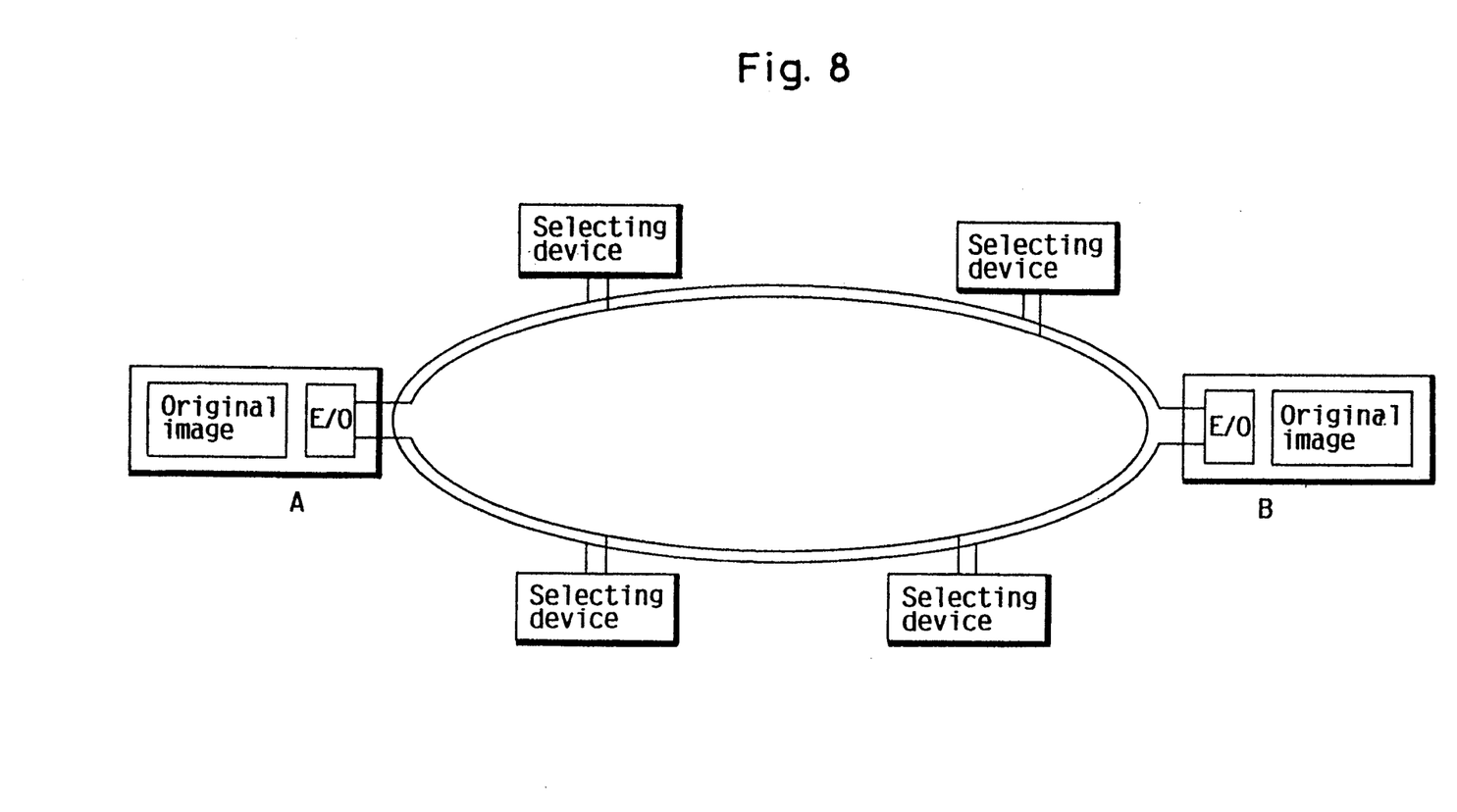
FIG. 8 is a view showing another embodiment of the present invention.

FIG. 8 shows another embodiment of the present invention. The image-playback-unit groups A and B are connected to each other in a ring by the optical transmission lines through the electrical/optical conversion units installed therein. In addition, plural selecting devices, or the selection/allocation switch 105 and transmitter 106 as shown in FIG. 2, are connected to the transmission lines, each of which transmits the image signals to the subscribers in the star network. By taking the advantage of this structure, a myriad of images become available and the utilization efficiency of the original image signals can be improved, therefore decreasing the costs of the original image to that of the whole system in the ratio.

It should be noted that the cable broadcasting system of the present invention enables the subscribers to watch the images at their request as well as to enjoy the various options in the program selection with a more flexible schedule than has never been attained before, and the system can be applied to the existing CATV networks with a minor alternation due to its simple structure resulting from the image signal transmission in the high rate optical multiplexed signals as well as the gradual selection of the requested image signal by disassembling the selected TDM signal, particularly when the numbers of the image signals, the TDM signals, and the times of the disassembling of the TDM signal are to be multiplied by $2^k$, where k is an integer.

Although the present invention has been fully described by way of examples with reference to the accompanying drawings, it is to be noted that various changes and modifications will be apparent to those skilled in the art. Therefore, unless otherwise such changes and modifications will be apparent to those skilled in the art. Therefore, unless otherwise such changes and modifications depart form the scope of the present invention, they should be constructed as being included therein.

What is claimed is:

1. A transmission center for on demand television for communicating with subscribers and providing a plurality of television channels to subscribers, each channel being capable of carrying at least one image signal, the transmission center comprising:

an image playback means for producing a plurality of image programs repetitively, each image program being simultaneously available in more than one version, the versions being identical except for being time-shifted in relation to one another;

a receiving means for receiving a demand for an image program from the subscribers;

a first selection means for selecting the image program demanded by the subscriber, the selected image program being one of the versions of the plurality of image programs repetitively produced by the image playback means;

a second selection means for selecting an available channel in a transmission line connecting the transmission center and a group of the subscribers to provide the selected image program to the subscribers as the image signal;

a signal processing means for enciphering the image signal of the selected image program, and subsequently modulating and multiplexing the enciphered image signal;

a transmission means for transmitting the image signal of the image program selected by the first selection means to the subscriber on the channel selected by the second selection means after the processing of the signal by the signal processing means; and a notifying means for notifying the subscriber of the selected channel and a deciphering key for the image signal.

2. The transmission center of claim 1, wherein the number of first selection means, second selection means, signal processing means, and transmission means are all equal to the number of transmission lines, the number of transmission lines being equal to the number of groups, each group having a plurality of subscribers.

3. The transmission center of claim 2, wherein the image playback means comprises devices which create time-division multiplexed signals of each image program, and the first selection means includes a device which selects the time-division multiplexed signal of the version of the image program demanded by the subscriber.

4. The transmission center of claim 3, wherein the image playback means further comprises storing means for storing a schedule of the time-shifted versions of the image programs and their respective deciphering keys in order to facilitate the selection of one version starting at the earliest possible time after receipt of the demand.

5. The transmission center of claim 4, wherein the second selection means further comprises monitoring means for monitoring the channels and determining the time when the channel will be available in order to select an available channel on which to transmit the version selected by the first selection means, and wherein each channel is equipped with a channel switching means and the second selection means selects the channel switching means associated with the selected channel.

6. The transmission center of claim 5, wherein each channel switching means outputs the image signal to the signal processing means.

7. The transmission center of claim 6, wherein the transmission means converts the image signal into an optical signal to be transmitted on transmission lines capable of transmitting the optical signal.

8. The transmission center of claim 6, wherein a communication line is provided to connect the receiving means and the notifying means to enable a communication between the transmission center and the subscriber via one of the transmission line and the communication line.

9. A cable television broadcasting system for providing a plurality of image programs for on demand television service to subscribers, the cable broadcasting system comprising:

a plurality of transmission lines for enabling a transmission center to provide a plurality of image programs as image signals to the subscribers, the plurality of transmission lines comprising first transmission lines extending from the transmission center to a plurality of groups, each group having a plurality of subscribers, and second transmission lines in a tree network for connecting the first transmission line and the subscribers;

the transmission center comprising:

an image playback means for producing a plurality of image programs repetitively, each image program being simultaneously available in more than one version, the versions being identical except for being time-shifted in relation to one another;

a receiving means for receiving a demand for an image program from the subscriber;

a first selection means for selecting the image program demanded by the subscriber, the selected image program being one of the versions of the plurality of image programs repetitively produced by the image playback means;

a second selection means for selecting an available channel in the first and the second transmission lines to provide the selected image program to the subscribers as the image signal;

a signal processing means for enciphering the image signal of the selected image program, and subsequently modulating and multiplexing the enciphered image signal for transmission to the subscriber on the channel selected by the second selection means;

a transmission means for transmitting the image signal of the image program selected by the first selection means, the image signal being transmitted on the channel selected by the second selection means to the subscriber after being processed by the signal processing means; and a notifying means for sending a notice to the subscriber of both a deciphering key for the image signal and the channel selected by the second selection means;

an image signal receiving means provided to each subscriber for receiving the image signal transmitted from the transmission center; and a communication means provided to each subscriber for making a demand for an image program to the transmission center and for receiving a notice from the transmission center.

10. The cable television broadcasting system of claim 9, wherein the number of first selection means, second selection means, signal processing means, and transmission means are all equal to the number of the first transmission lines, the number of the first transmission lines being equal to the number of groups.

11. The cable television broadcasting system of claim 10, wherein the image playback means includes devices for creating time-division multiplexed signals of each image program, and wherein the first selection means includes a device which extracts the time-division multiplexed signal of the image program demanded by the subscriber.

12. The cable television broadcasting system of claim 11, wherein the image playback means further comprises storing means for storing a schedule of the time-shifted versions of the image programs and the respective deciphering keys in order to select the version starting at the earliest possible time after receipt of the demand.

13. The cable television broadcasting system of claim 12, wherein the second selection means further comprises monitoring means for monitoring the channels and the time when the channel will be available in order to select an available channel on which to transmit the image program selected by the first selection means, and wherein each channel is equipped with a channel switching means and the second selection means selects the channel switching means associated with the selected channel.

14. The cable television broadcasting system of claim 13, wherein each channel switching means outputs the image signal to the signal processing means.

15. The cable television broadcasting system of claim 14, wherein the transmission means converts the image signal into an optical signal to be transmitted on the first transmission lines, the first transmission lines being capable of transmitting the optical signal.

16. The cable television broadcasting system of claim 15, wherein a communication line is provided to connect the receiving means and the notifying means to enable a communication between the transmission center and the subscriber via the first and second transmission lines and the communication line.

17. The cable television broadcasting system of claim 15, wherein the image signal receiving means is capable of receiving the optical signal.

18. The cable television broadcasting system of claim 14, wherein the number of image signal receiving means is provided in response to a bandwidth capability of the transmission lines and an efficient usage of the channels.

19. A transmission center for on demand television for communicating with subscribers and providing a plurality of television channels to subscribers, each channel being capable of carrying at least one image signal, the transmission center comprising:

a plurality of transmission lines for connecting the transmission center with a plurality of distribution system sections, the distribution section comprising a delivery line connecting the subscribers to the transmission line, the delivery line arranged in a network so that the subscribers share the delivery line without the need for a delivery line dedicated to each subscriber;

a receiving means for receiving a demand for an image program from the subscribers;

an image playback means for producing a plurality of image programs, each image program being simultaneously available in more than one version, the versions being identical except for being time-shifted in relation to one another;

an encoding means for encoding the plurality of image programs into a multiplexed signal;

a first selection means for selecting, from the multiplexed signal, the image program demanded by the subscriber;

a second selection means for selecting an available television channel in the distribution system section;

a transmission means for transmitting the image program selected by the first selection means to the distribution system section on the channel selected by the second selection means; and a notifying means for notifying the subscriber of the selected television channel.

20. The transmission center of claim 19, wherein the encoding means comprises devices which create time-division multiplexed signals containing all the image programs, and the first selection means includes devices which selects the time-division multiplex signal which includes the image program corresponding to the demand made by the subscriber and thereafter disassembles the selected time-division multiplex signal into the demanded image program.

21. The transmission center of claim 19, wherein the transmission means includes means for enciphering the image program selected by the first selection means, and means for modulating and multiplexing the enciphered image program prior to transmitting the image program on the channel selected by the second selection means.

22. A cable television broadcasting system for providing on demand television service comprising:

a plurality of distribution system sections to provide a plurality of television channels to subscribers, each channel being capable of carrying at least one image program, the system section comprising delivery lines which are arranged in a network such as a tree network so that the subscribers connected to the section share the same line without need for an individual delivery line dedicated to each subscriber;

a plurality of receivers attached to the distribution systems and equipped with means used by the subscribers for making a demand for an image program and means for transmitting the demand to the broadcasting system; and a transmission center comprising:

a plurality of transmission lines for connecting the transmission center with the distribution system sections;

an image playback means for repetitively producing a plurality of different image programs, each image program being simultaneously available in multiple versions, the versions being identical except for being time-shifted in relation to one another with each succeeding version starting at a later time than the preceding version;

an encoding means for encoding the plurality of image programs into a multiplexed signal;

optical transmission means for transmitting the multiplexed signal;

a first selection means for selecting, from the multiplexed signal, the image program demanded by the subscriber;

a second selection means for selecting an available television channel in the distribution system section;

a transmission means for transmitting the image program selected by the first selection means through the transmission line to the distribution system section on the channel selected by the second selecting means; and a notifying means for notifying the receiver of the selected television channel.

23. The cable television broadcasting system of claim 22, wherein the transmission means further includes means for enciphering the image program selected by the first selection means, and means for modulating and multiplexing the enciphered image program prior to transmitting the image program on the channel selected by the second selection means, and wherein the notifying means further includes means for notifying the receiver of the key for deciphering the enciphered image program.

* * * * *